(No Model.)

J. R. BURDICK.
ROLLER THRUST BEARING.

No. 529,853.  Patented Nov. 27, 1894.

WITNESSES:
R. B. Shepherd.
H. M. Stevenson

INVENTOR
John R. Burdick
BY
Clarence _____
ATTORNEY

THE NORRIS PETERS CO., PHOTO-LITHO., WASHINGTON, D. C.

UNITED STATES PATENT OFFICE.

JOHN R. BURDICK, OF BROOKLYN, NEW YORK.

ROLLER THRUST-BEARING.

SPECIFICATION forming part of Letters Patent No. 529,853, dated November 27, 1894.

Application filed January 6, 1894. Renewed November 1, 1894. Serial No. 527,635. (No model.)

*To all whom it may concern:*

Be it known that I, JOHN R. BURDICK, a citizen of the United States, residing in the city of Brooklyn, county of Kings, and State of New York, have invented a certain new and useful Improvement in Roller Thrust-Bearings, of which the following is a specification.

This invention relates in general to bearings to receive the thrusts of shafts or axles, but more particularly to end bearings in which rollers are employed to receive the end thrust of shafts or axles, the special object of my invention being to provide a strong and durable roller end bearing in which "slip" will be substantially all avoided, and whereby friction and wear due to the flexure of the shaft axle will be reduced to a minimum.

The invention consists mainly of a bearing head on the end of the shaft or axle, curved on a sphere having its center approximately at the average center of flexure of the shaft or axle, and fitted to turn in a nest of correspondingly curved bearing rollers radiating from the axis of the shaft or axle, all as hereinafter described and claimed.

Reference is to be had to the accompanying drawings, forming part of this specification, in which—

Figure 1:
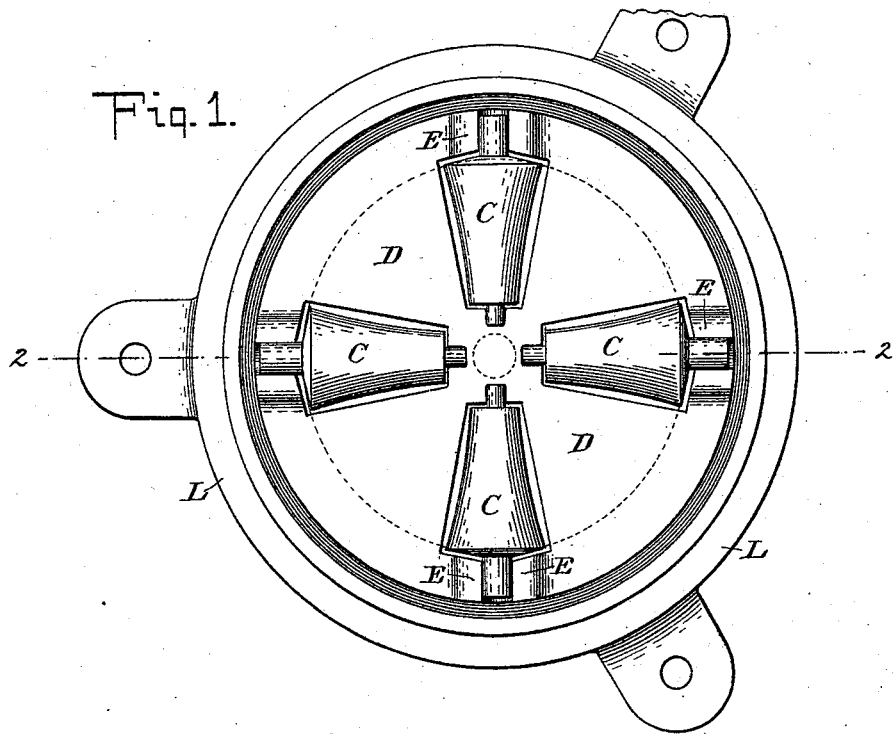
Figure 2:
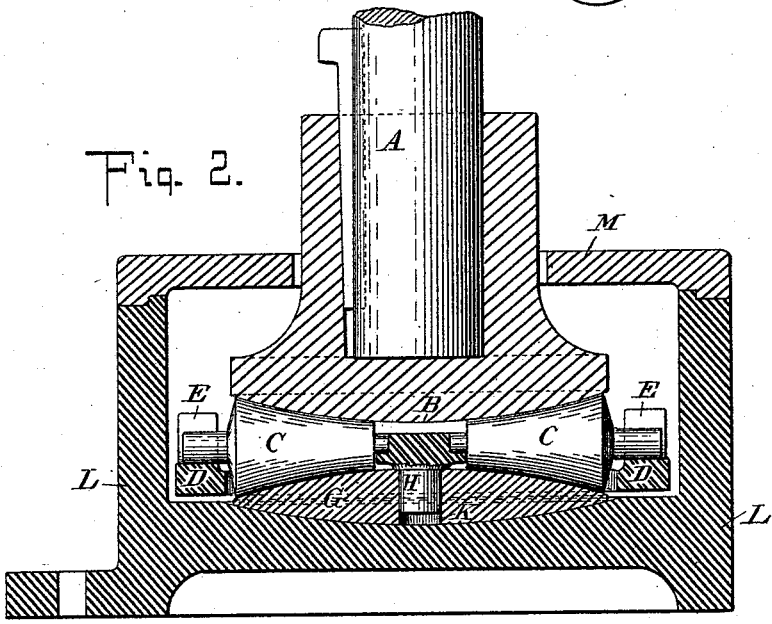

Figure 1 is a plan view of a roller thrust bearing embodying my invention, designed for the end bearing head of a shaft. Fig. 2 is a transverse sectional view of the same on the line 2 2, Fig. 1.

Like parts are designated by the same letters of reference in both figures.

The end thrust bearing shown I designed particularly to receive the lower end of a vertical shaft, for instance that of a centrifugal machine, but it is equally well adapted for use in connection with the lateral bearing of a car axle, particularly the "Copeland" bearing wherein the axle is allowed to flex slightly.

A designates the shaft, and B its end bearing head, which is here shown as a detachable part of the shaft, but in the case of a car axle would be the end of the axle itself, or in the case of the line thrust or collar bearing of a shaft would be the bearing face or end of the collar. In any case I make the bearing head B convex, and forming the segment of a sphere having its center on the axis of the shaft A as shown, and provide the bearing with a plurality of rollers C radiating from said axis and concaved in longitudinal section to fit the head B, the curvature of said bearing head and rollers and the diameter of said rollers being so adjusted that all the circles of contact of said bearing head and rollers will travel as near as possible at the same speed, so as to avoid slip and its consequent increased friction and wear.

I employ the described curvature for the bearing head B and the rollers C, by preference, to avoid the outward thrust which the bearing-head would place upon the rollers were both tapered conically instead.

To properly support the rollers C in their radial positions, I employ a ring D formed with radial bearings E for the end gudgeons of the rollers, and make said roller bearings E open at the top so that the rollers may be readily removed and replaced.

To receive the thrust placed upon the rollers, I mount them to run around a bed G convexed oppositely to but like the bearing-head B, and mount the ring D to rotate on the bed G, as the rollers run, by means of a central gudgeon H on the ring fitted in a socket K in said bed. I fix the bed G within a box L, which is secured horizontally on a suitable base in the case of a vertical shaft as shown, and in the case of a car axle would be secured vertically to the truck.

When used with the "Copeland" lateral bearing as before mentioned, the opening M through which the axle emerges from the box is made larger than the axle to accommodate the flexure allowed by said bearing, as owing to the described spherical curvature of the bearing-head and rollers the bearing-head can swing on the rollers in accordance with said flexure, the said curvature being described as nearly as possible from the center of flexure.

In the case of the line thrust bearing before referred to, as the shaft A would continue through the bearing and its collar act as the bearing-head, the central body and gudgeon of the ring D and the bed G would have merely to be enlarged and bored to receive the shaft.

I claim—

The combination, with the bearing head of a shaft or axle convexed on a sphere described from a center on the axis of the shaft or axle, of a nest of bearing rollers radiating from said axis and concaved longitudinally on the same sphere, whereby spreading of the bearing rollers is counteracted, and flexure of the shaft or axle accommodated, substantially as herein described.

JOHN R. BURDICK.

Witnesses:
 H. M. STEVENSON,
 BURNHAM KALISCH.